United States Patent
Wang et al.

(10) Patent No.: US 12,235,449 B2
(45) Date of Patent: Feb. 25, 2025

(54) OPTICAL DISPLAY SYSTEM, CONTROL METHOD AND DISPLAY DEVICE

(71) Applicants: Beijing BOE Optoelectronics Technology Co., Ltd., Beijing (CN); BOE Technology Group Co., Ltd., Beijing (CN)

(72) Inventors: Chenru Wang, Beijing (CN); Ruijun Dong, Beijing (CN); Ke Li, Beijing (CN); Yulong Wu, Beijing (CN); Lili Chen, Beijing (CN); Hao Zhang, Beijing (CN); Feng Qu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 540 days.

(21) Appl. No.: 17/627,087

(22) PCT Filed: Mar. 18, 2021

(86) PCT No.: PCT/CN2021/081567
§ 371 (c)(1),
(2) Date: Jan. 13, 2022

(87) PCT Pub. No.: WO2021/218474
PCT Pub. Date: Nov. 4, 2021

(65) Prior Publication Data
US 2022/0252885 A1 Aug. 11, 2022

(30) Foreign Application Priority Data
Apr. 30, 2020 (CN) .......................... 202010364544.1

(51) Int. Cl.
*G02B 27/01* (2006.01)
*G02B 5/30* (2006.01)
(Continued)

(52) U.S. Cl.
CPC ....... *G02B 27/0172* (2013.01); *G02B 5/3058* (2013.01); *G02B 27/283* (2013.01); *G02F 1/13731* (2013.01); *G02B 30/25* (2020.01)

(58) Field of Classification Search
CPC .. G02B 27/01; G02B 27/017; G02B 27/0101; G02B 27/0172; G02B 27/0018;
(Continued)

(56) References Cited

U.S. PATENT DOCUMENTS

| | | | |
|---|---|---|---|
| 6,400,493 | B1 | 6/2002 | Mertz et al. |
| 2011/0222022 | A1* | 9/2011 | Sato ................... G03B 21/2073 353/20 |

(Continued)

FOREIGN PATENT DOCUMENTS

| CN | 106444046 A | 2/2017 |
|---|---|---|
| CN | 206321883 U | 7/2017 |

(Continued)

OTHER PUBLICATIONS

CN202010364544.1 first office action and search report.

*Primary Examiner* — Sultan Chowdhury
(74) *Attorney, Agent, or Firm* — IPro, PLLC

(57) ABSTRACT

An optical display system, a control method, and a display device, relates to the field of display technology. The optical display system comprises a display screen a first light splitting unit disposed at a display side of the display screen; a first imaging unit comprising a light splitting film disposed at a light-incident surface of the first imaging unit; a second light splitting unit disposed at a light emission side of the first imaging unit; a phase modulation unit disposed at least in a light path from the first imaging unit to the second light splitting unit; wherein, the first-type polarized light transmitted from the first light splitting unit is transmitted from a light emission side of the second light splitting unit, after (Continued)

being turned back multiple times between the first imaging unit and the second light splitting unit.

20 Claims, 4 Drawing Sheets

(51) Int. Cl.
*G02B 27/28* (2006.01)
*G02F 1/137* (2006.01)
*G02B 30/25* (2020.01)

(58) Field of Classification Search
CPC .... G02B 27/283; G02B 27/286; G02B 5/005; G02B 5/3058; H04N 9/3144; H04N 9/3155; H04N 9/3161; H04N 9/3164; H04N 9/3167; H04N 9/3197; G03B 21/005; G03B 21/006; G03B 21/008; G03B 21/28; G03B 21/208; G02F 1/137; G02F 1/13718; G02F 1/13731
See application file for complete search history.

(56) References Cited

U.S. PATENT DOCUMENTS

| | | | | |
|---|---|---|---|---|
| 2016/0037142 | A1* | 2/2016 | Nakajima | G02B 27/48 353/38 |
| 2016/0195732 | A1* | 7/2016 | Huang | G02B 27/149 359/212.1 |
| 2018/0180889 | A1 | 6/2018 | Lee et al. | |
| 2020/0310235 | A1* | 10/2020 | Guo | G03B 21/006 |
| 2021/0033878 | A1 | 2/2021 | Ruan et al. | |
| 2021/0168340 | A1* | 6/2021 | Mochizuki | G09G 3/34 |

FOREIGN PATENT DOCUMENTS

| | | |
|---|---|---|
| CN | 108227209 A | 6/2018 |
| CN | 108241212 A | 7/2018 |
| CN | 108919494 A | 11/2018 |
| CN | 208421422 U | 1/2019 |
| CN | 109507807 A | 3/2019 |
| CN | 109946837 A | 6/2019 |
| CN | 110161699 A | 8/2019 |
| CN | 209265082 U | 8/2019 |
| CN | 110308559 A | 10/2019 |
| CN | 209496201 U | 10/2019 |
| CN | 110515208 A | 11/2019 |
| CN | 110646942 A | 1/2020 |
| CN | 110967831 A | 4/2020 |
| CN | 111443491 A | 7/2020 |
| EP | 0718645 A2 | 6/1996 |
| EP | 0803756 A1 | 10/1997 |
| JP | 2001166227 A | 6/2001 |
| TW | M591624 U | 3/2020 |

* cited by examiner

Optical display system

OPTICAL DISPLAY SYSTEM, CONTROL METHOD AND DISPLAY DEVICE

CROSS REFERENCE TO RELEVANT APPLICATIONS

The application claims the priority of the Chinese patent application filed on Apr. 30, 2020 before the Chinese Patent Office with the application number of 202010364544.1 and the title of "OPTICAL DISPLAY SYSTEM, CONTROL METHOD AND DISPLAY DEVICE", which is incorporated herein in its entirety by reference.

TECHNICAL FIELD

The present disclosure relates to the technical field of display, and particularly relates to an optical display system, a control method, and a display device.

BACKGROUND

Virtual reality (VR) technology is a brand-new practical technology developed in the 20th century.

Virtual reality technology includes computer technology, electronic information, and simulation technology, its basic implementation mode is to simulate a virtual environment by computer, to give people a sense of environmental immersion.

With the continuous development of social productivity and science and technology, there is an increasing demand for VR technology in all walks of life. It is also made great progress in VR technology, and it has gradually become a new field of science and technology. Hardware devices related to VR technology, such as VR displays, are also under continuous development. For example, in addition to VR technology, with the development of technology, there is also a further developed augmented reality (AR) technology.

SUMMARY

The embodiments of the present disclosure provide an optical display system, a control method, and a display device.

The embodiments of the present disclosure use the following technical solutions:

in one aspect, an optical display system is provided, and the system comprises:
a display screen;
a first light splitting unit, disposed at a display side of the display screen, wherein the first light splitting unit is configured to a transmit first-type polarized light and block a second-type polarized light, and light emitted from the display screen is converted into the first-type polarized light after passing through the first light splitting unit;
a first imaging unit, disposed at a light emission side of the first light splitting unit, wherein the first imaging unit comprises a light splitting film disposed at a light-incident surface of the first imaging unit, and the light splitting film is capable of transmitting and reflecting light;
a second light splitting unit, disposed at a light emission side of the first imaging unit, wherein the second light splitting unit is configured to transmit the first-type polarized light and reflect the second-type polarized light; and
a phase modulation unit, disposed at least in a light path from the first imaging unit to the second light splitting unit, wherein the phase modulation unit is configured to modulate a phase of light, to realize mutual conversion between the first-type polarized light and the second-type polarized light;
wherein, the first-type polarized light transmitted from the first light splitting unit is transmitted from a light emission side of the second light splitting unit, after being turned back multiple times between the first imaging unit and the second light splitting unit.

Optionally, the phase modulation unit comprises a first quarter-wave plate and a second quarter-wave plate;
the first quarter-wave plate is disposed in a light path from the first light splitting unit to the first imaging unit; the second quarter-wave plate is disposed in the light path from the first imaging unit to the second light splitting unit.

Optionally, the optical display system further comprises a second imaging unit disposed at the light emission side of the second light splitting unit.

Optionally, the first imaging unit further comprises a first lens, the light splitting film is disposed at a light-incident surface of the first lens; and the second imaging unit comprises a second lens.

Optionally, the first lens is a glass lens, and the second lens is a plastic lens.

Optionally, the second imaging unit further comprises a metal wire-grid film disposed at a light-incident surface of the second lens; and
the metal wire-grid film is configured to be capable to transmit the first-type polarized light and capable to absorb the second-type polarized light.

Optionally, the phase modulation unit is disposed in the light path from the first imaging unit to the second light splitting unit; and
the phase modulation unit is further configured to modulate the phase of light at different angles in different display periods.

Optionally, the phase modulation unit comprises a liquid crystal phase modulator or a removable half-wave plate.

Optionally, the first light splitting unit comprises a first polaroid or a second polaroid;
the first polaroid is configured to transmit the first-type polarized light and reflect the second-type polarized light; and
the second polaroid is configured to be capable to transmit the first-type polarized light and capable to absorb the second-type polarized light.

Optionally, the first imaging unit further comprises a first lens, and the light splitting film is disposed at a light-incident surface of the first lens.

Optionally, the second light splitting unit comprises a third polaroid, and the third polaroid is configured to transmit the first-type polarized light and reflect the second-type polarized light.

Optionally, the first-type polarized light is P-type polarized light, the second-type polarized light is S-type polarized light; or, the first-type polarized light is the S-type polarized light, the second-type polarized light is the P-type polarized light.

In another aspect, a display device is provided, and the display device comprises the above optical display system.

Optionally, the display device is a virtual reality display device or an augmented Reality display device.

Optionally, the display device comprises a folded optical system.

In another aspect, a method for controlling the above optical display system is provided, and the control method comprises:

at a first time period, inputting a first focal plane image signal to the display screen;

controlling the display screen to display a first focal plane image; wherein the light emitted from the display screen forms an enlarged image corresponding to a first focal length, after passing through the first light splitting unit and the first imaging unit in sequence;

controlling, at the first time period, the phase modulation unit to have a zero-degree phase modulation value of the light transmitted by the first imaging unit; wherein light modulated by the phase modulation unit is emitted by the second light splitting unit;

at a second time period, inputting a second focal plane image signal to the display screen; and controlling the display screen to display a second focal plane image; wherein the light emitted from the display screen is converted into the first-type polarized light after passing through the first light splitting unit; the first-type polarized light transmitted from the first light splitting unit is transmitted from the light emission side of the second light splitting unit, after being turned back multiple times among the first imaging unit, the phase modulation unit and the second light splitting unit, and forms an enlarged image corresponding to a second focal length.

Optionally, the phase modulation unit comprises a removable half-wave plate;

the step of controlling, at the first time period, the phase modulation unit to have a zero-degree phase modulation value of the light transmitted by the first imaging unit, comprises:

at the first time period, removing the half-wave plate.

The present disclosure further provides a computing and processing device, comprising:

a memory, wherein the memory stores a computer-readable code; and one or more processors, and when the computer-readable code is executed by the one or more processors, the computing and processing device executes the above method for controlling the optical display system.

The present disclosure further provides a computer program, the computer program comprises a computer-readable code, and when the computer-readable code is executed on a computing and processing device, the computer-readable code causes the computing and processing device to implement the above method for controlling the optical display system.

The present disclosure further provides a computer-readable medium, and the computer-readable medium stores the above computer program.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are embodiments of the present disclosure, and a person skilled in the art can obtain other figures according to these figures without paying creative work.

DETAILED DESCRIPTION OF THE EMBODIMENTS

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, words such as "first" and "second" are used to distinguish the same items or similar items that have basically the same function and effect, which are only used to clearly describe the technical solutions of the embodiments of the present disclosure, and cannot to be understood as indicating or implying relative importance or implicitly indicating the number of technical features indicated.

Figure 1:
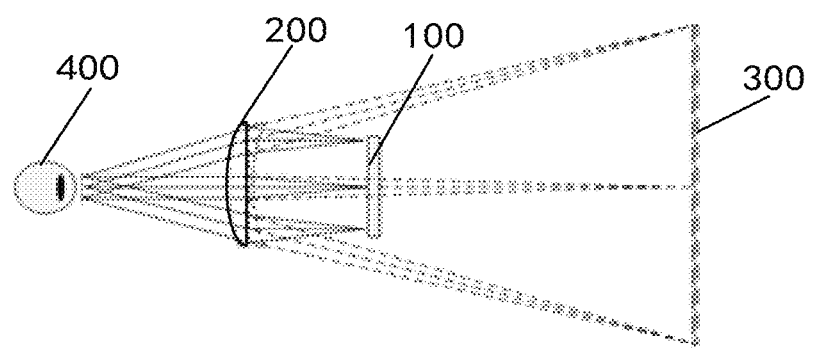
FIG. 1 is a structural diagram of VR according to the related art.

The structure and the light path used in VR technology are shown in FIG. 1, the image source generated by the display 100 becomes a magnified and enlarged virtual image 300 after being refracted by a traditional optical lens 200, to benefit observation of the human eye 400.

Figure 2:
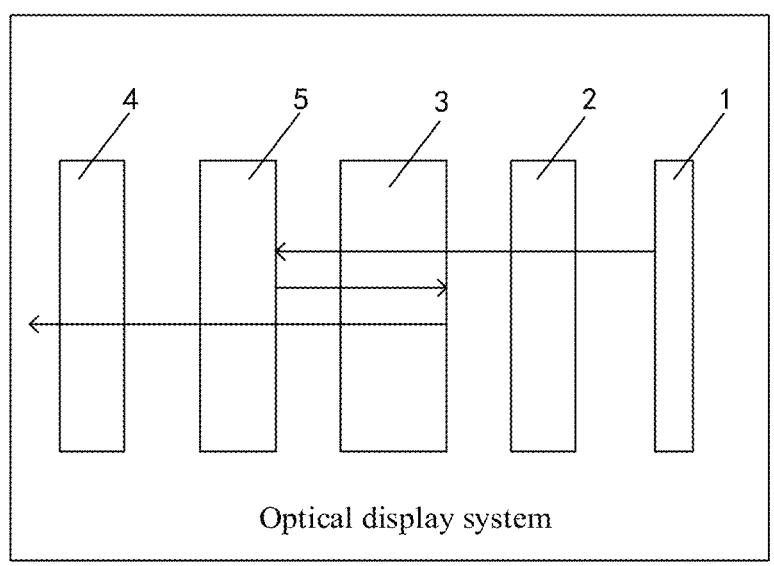
FIG. 2 is a structural schematic diagram of an optical display system according to an embodiment of the present disclosure.

An embodiment of the present disclosure provides an optical display system, referring to FIG. 2, including a display screen 1, a first light splitting unit 2, a first imaging unit 3, a second light splitting unit 4, and a phase modulation unit 5.

The type of the display screen 1 is not limited, for example, the display screen may be anyone of a Liquid Crystal Display (LCD) display screen, an Organic Light-Emitting Diode (OLED) display screen, a Micro OLED micro-display screen, and a Mini LED micro-display screen; may also be a Digital Light Processing (DLP) display screen; may also be a Liquid Crystal on Silicon (LCOS) display screen, etc. In addition, the display screen may be a flexible screen or a rigid screen (that is, a non-flexible screen). In actual applications, it can be selected according to user needs.

The first light splitting unit 2 is disposed at a display side of the display screen 1, and the first light splitting unit 2 is configured to transmit a first-type polarized light and a block second-type polarized light. light emitted from the display is converted into the first-type polarized light after passing through the first light splitting unit.

Herein, the display side of the display screen refers to a side where the display screen emits light, that is, light emission side. In addition, polarization vectors of the first-type polarized light and the second-type polarized light are different. For example, the first-type polarized light is the P-type polarized light (abbreviated as P light), the second-type polarized light is the S-type polarized light (abbreviated as S light); of course, the first-type polarized light may also be the S-type polarized light, and the second-type polarized light may also be the P-type polarized light.

The meaning of the P-type polarized light and the S-type polarized light is explained as bellow. When light penetrates a surface of an optical element (such as a light splitter) at a non-perpendicular angle, both the characteristics of reflection and transmission depend on the polarization phenomenon. In this case, a coordinate system used is defined by a plane containing an input light beam and a reflected light beam. If the polarization vector of the light is in this plane, it is called the P-type polarized light; and if the polarization vector is perpendicular to the plane, it is called the S-type polarized light.

The above-mentioned first light splitting unit is configured to block second-type polarized light, the method of blocking is not limited here, for example, it may be blocking by reflection or absorption.

The specific structure of the first light splitting unit is not limited here, as long as it can achieve the functions of transmitting the first-type polarized light and blocking the second-type polarized light. For example, the first light splitting unit may be a polaroid that can transmit the P light and reflect the S light; or the polaroid can transmit the P light and absorb the S light.

The first imaging unit 3 is disposed at a light emission side of the first light splitting unit 2, the first imaging unit includes a light splitting film disposed at a light-incident surface of the first imaging unit, and the light splitting film is able to transmit light and reflect light.

The above-mentioned first imaging unit may include a single lens or a combination of a plurality of lenses (ie, a multi-lens group). Considering to further reduce the thickness, the single lens can be selected. In this case, the light splitting film can be set on the light-incident surface of the single lens. There is no limitation on the setting method of the light splitting film here, it can be set by coating or pasting. In practice, coating methods are mostly used. There is no limitation on a light splitting ratio of the light splitting film, the light splitting ratio is the ratio of transmitted light to reflected light. For example, the light splitting ratio is 5:5, that is, the light splitting film can transmit half of the light and reflect half of the light. At this time, the light splitting film is also called a transflective film; the light splitting ratio of the light splitting film can also be another ratio, such as 6:4, 7:3, etc., will not be listed here.

The second light splitting unit 4 is disposed at a light emission side of the first imaging unit 3, and the second light splitting unit 4 is configured to transmit the first-type polarized light and reflect the second-type polarized light.

The specific structure of the second light splitting unit is not limited here, as long as it can achieve the functions of transmitting the first-type polarized light and reflecting the second-type polarized light. If the first-type polarized light is the P-type polarized light, the second-type polarized light is the S-type polarized light, the second light splitting unit can transmit the P-type polarized light and reflect the S-type polarized light.

The phase modulation unit 5 is disposed at least in a light path from the first imaging unit 3 to the second light splitting unit 4, and the phase modulation unit 5 is configured to modulate a phase of light, to realize mutual conversion between the first-type polarized light and the second-type polarized light.

Wherein, the first-type polarized light transmitted from the first light splitting unit is transmitted from a light emission side of the second light splitting unit, after being turned back multiple times between the first imaging unit and the second light splitting unit.

The above-mentioned that the phase modulation unit is disposed at least in the light path from the first imaging unit to the second light splitting unit refers to: the phase modulation unit is disposed in the light path from the first imaging unit to the second light splitting unit as shown in FIG. 2; or, the phase modulation unit may also be disposed in another light path, for example, the phase modulation unit is disposed in the light path from the first imaging unit to the second light splitting unit and the light path from the first light splitting unit to the first imaging unit. The specific setting position needs to be selected according to the structure of the phase modulation unit. In FIG. 2, the first-type polarized light transmitted from the first light splitting unit is shown as an example after being turned back twice between the first imaging unit and the second light splitting unit. Of course, the number of turn-backs may also be greater than 2, and the specific number of turn-backs needs to be determined according to the actual optical path structure.

The specific structure of the phase modulation unit is not limited here, for example, the phase modulation unit may include anyone of a half-wave plate (also called a λ/2 wave plate), a quarter-wave plate (also called a λ/4 wave plate), and a liquid crystal phase modulator.

The above-mentioned optical display system can be used in a virtual reality (VR) display device, and can also be used in other display devices including a folded optical system.

The embodiment of the present disclosure provides an optical display system, including: a display screen; a first light splitting unit, disposed at a display side of the display screen; and configured to transmit first-type polarized light and block second-type polarized light; a light emitted from the display is converted into the first-type polarized light after passing through the first light splitting unit; a first imaging unit, disposed at a light emission side of the first light splitting unit; the first imaging unit includes a light splitting film disposed at a light-incident surface of the first imaging unit, and the light splitting film is able to transmit light and reflect light; a second light splitting unit, disposed at a light emission side of the first imaging unit; and configured to transmit the first-type polarized light and reflect the second-type polarized light; and a phase modulation unit, disposed at least in a light path from the first imaging unit to the second light splitting unit, and configured to modulate a phase of light, to realize mutual conversion between the first-type polarized light and the second-type polarized light; wherein, the first-type polarized light transmitted from the first light splitting unit is transmitted from a light emission side of the second light splitting unit, after being turned back multiple times between the first imaging unit and the second light splitting unit.

In the optical display system, the first imaging unit, the phase modulation unit, and the second light splitting unit are combined, so that the first-type polarized light transmitted from the first light splitting unit is turned back multiple times between the first imaging unit and the second light splitting unit, which can realize the folding of the optical path and shorten the actual length of the optical path, thereby meeting the requirements of thinning.

According to the specific setting position of the phase modulation unit, specific instruction of two different structures is provided below.

The first structure, the phase modulation unit includes a first quarter-wave plate and a second quarter-wave plate; the first quarter-wave plate is disposed in a light path from the first light splitting unit to the first imaging unit; and the second quarter-wave plate is disposed in the light path from the first imaging unit to the second light splitting unit.

The above-mentioned quarter-wave plate (also called λ/4 wave plate) is a birefringent single crystal wave plate with a certain thickness. When light with a certain wavelength enters the wave plate perpendicularly, a phase difference between an emitted ordinary light and an emitted extraordinary light is ¼ wavelength. In the optical path, it is often used to convert linearly polarized light into circularly polarized light or elliptically polarized light; or vice versa, to change the polarization state of light.

Thus, the first-type polarized light transmitted from the first light splitting unit becomes the circularly polarized light or the elliptically polarized light after passing through the first quarter-wave plate; and then, the circularly polarized light or the elliptically polarized light reaches the second quarter-wave plate after being amplified by the first imaging unit; under the effect of the second quarter-wave plate, the phase of the light changes again and is converted into second-type polarized light; then, the second-type polarized light is reflected by the second light splitting unit and then is incident on the second quarter-wave plate, and under the effect of the second quarter-wave plate, it is converted into the circularly polarized light or the elliptically polarized light; after the circularly polarized light or the elliptically polarized light is reflected by the light splitting film of the first imaging unit, it turns back to the second quarter-wave plate, the phase changes at the same time; after passing through the second quarter-wave plate, it is converted into the first-type polarized light; finally, it is transmitted from the light emission side of the second light splitting unit. That is, the first-type polarized light transmitted from the first light splitting unit is turned back twice among the first imaging unit, the second quarter-wave plate, and the second light splitting unit, and is finally transmitted from the light emission side of the second light splitting unit.

Optionally, in order to improve image quality and improve distortion, the optical display system further includes a second imaging unit disposed at the light emission side of the second light splitting unit.

The second imaging unit may include a single lens or a combination of a plurality of lenses (ie, a multi-lens group). Considering to further reduce the thickness, the single lens can be selected.

Optionally, in order to reduce the weight and thickness as much as possible, to achieve lightness and thinness, the first imaging unit further includes a first lens, the light splitting film is disposed at a light-incident surface of the first lens; and the second imaging unit includes a second lens.

In the folded optical system, the realization of optical path folding has strict requirements on the phase of light, otherwise there will be poor stray light. Optionally, the first lens is a glass lens, and the second lens is a plastic lens. In this way, on the one hand, poor stray light can be avoided; on the other hand, the second lens is a plastic lens, which can further reduce the weight compared to a glass lens. That is, it can be as light and thin as possible under the premise of ensuring the image quality. Here the second lens can be an injection-molded plastic lens.

In order to further reduce the ghosting phenomenon caused by stray light, the second imaging unit further includes a metal wire-grid film disposed at a light-incident surface of the second lens; and the metal wire-grid film is configured to be capable to transmit the first-type polarized light and capable to absorb the second-type polarized light. That is the metal wire-grid film only allows light with a single polarization direction to pass through.

Figure 3:
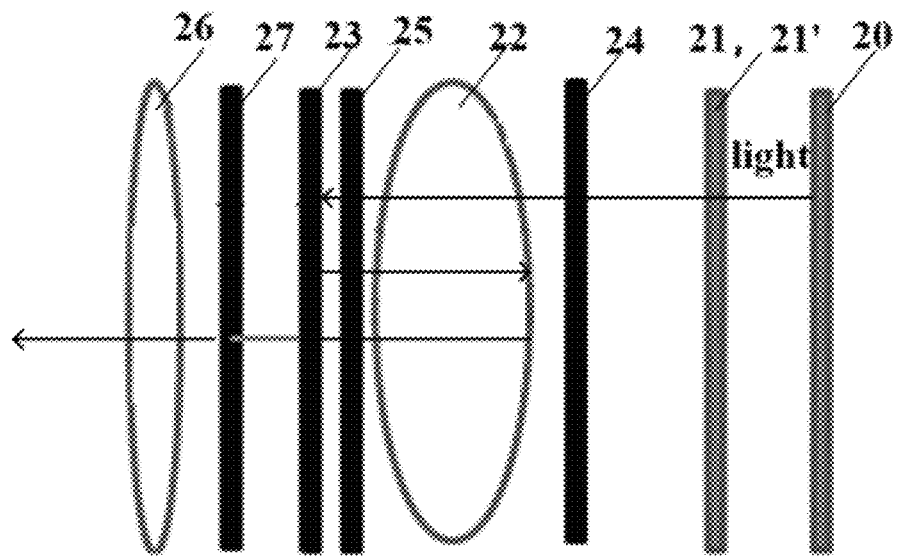
FIG. 3 is a structural schematic diagram of another optical display system according to an embodiment of the present disclosure.

Now take the system for VR optical display shown in FIG. 3 as an example for specific description.

In FIG. 3, the first light splitting unit is an absorption-type polaroid 21, which can transmit the P light and absorb the S light; or a reflection-type polaroid 21', which can transmit the P light and reflect the S light; the first imaging unit is a single glass lens 22, and the light-incident surface of the glass lens 22 is coated with a transflective film (not shown in FIG. 3); the second light splitting unit is a reflection-type polaroid 23, which can transmit the P light and reflect the S light; the phase modulation unit includes a first 24 wave plate 24 and a second λ/4 wave plate 25, the first λ/4 wave plate 24 is disposed in the light path from the absorption-type polaroid 21 to the glass lens 22, the second 24 wave plate 25 is disposed in the light path from the glass lens 22 to the reflection-type polaroid 23; the second imaging unit is a single plastic lens 26, which is disposed at a light emission side of the reflection-type polaroid 23, the light-incident surface of the plastic lens is provided with a metal wire-grid film (In FIG. 3, in order to clearly reflect the metal wire-grid film, the metal wire-grid film 27 and the lens 26 are placed separately. In practice, the metal wire-grid film 27 is disposed on the light-incident surface of the lens 26.), and the metal wire-grid film can transmit the P light and absorb the S light.

Referring to FIG. 3, after light emitted by a first display screen 20 passes through the absorption-type polaroid 21, the P light is transmitted to the first 24 wave plate 24, and the S light is absorbed; after the P light transmitted by the absorption-type polaroid 21 passes through the first λ/4 wave plate 24, it becomes left-handed circularly polarized light (viewed from the glass lens 22 to the first λ/4 wave plate 24); then, the left-handed circularly polarized light enters the transflective film, and part of the left-handed circularly polarized light is transmitted through the transflective film and is magnified by the glass lens 22, another part of the left-handed circularly polarized light is reflected; the left-handed circularly polarized light magnified by the glass lens 22 reaches the second λ/4 wave plate 25, and under the effect of the second λ/4 wave plate 25, the phase of light changes again, and is converted into the S light; then, the S light enters the reflection-type polaroid 23, and is reflected by it to the second 24 wave plate 25, and under the effect of the second λ/4 wave plate 25, it is converted into right-handed circularly polarized light (viewed from the glass lens 22 to the second λ/4 wave plate 25); the right-handed circularly polarized light passes through the glass lens 22, reaches the transflective film, and is reflected again, and then is turned back to the second 24 wave plate 25 through the glass lens 22, and at the same time is converted into left-handed circularly polarized light (viewed from the second 24 wave plate 25 to the glass lens 22); then, after passing through the second λ/4 wave plate 25, the left-handed circularly polarized light is converted into the P light; the P light passes through the reflection-type polaroid 23, reaches the plastic lens 26, and is finally transmitted from the light emission side of the plastic lens 26.

That is, the P light transmitted by the absorption-type polaroid is finally transmitted from the light emission side of the plastic lens, after being turned back twice among the glass lens, the second 24 wave plate, and the reflection-type polaroid. In the folded light path of the system for VR optical display, a one-piece glass lens is used to reduce the phase change caused by stress birefringence, thereby reducing ghosting; at the same time, due to the use of one piece of glass, the weight of the system is reduced as much as possible. In order to improve the image quality, the optical system is combined with another plastic lens to improve distortion and image quality problems. At the same time, a metal wire grid is coated on one side of the plastic lens to allow only light with a single polarization direction to pass through, which can further reduce ghosting caused by stray light. The system for VR optical display can achieve ultra-thin display, while under the premise of ensuring high image quality and greatly improving stray light, reduce weight as much as possible, and has the beneficial effect of short focus, and finally realize a thin and light display with high image quality and low stray light.

The second structure, the phase modulation unit is disposed in the light path from the first imaging unit to the second light splitting unit; and the phase modulation unit is further configured to modulate the phase of light at different angles in different display periods.

The angle modulated by the above-mentioned phase modulation unit is not limited here, and it can be zero degree, 90°, 180°, etc., and the specific modulation angle needs to be determined according to the actual structure.

Optionally, the above-mentioned phase modulation unit includes a liquid crystal phase modulator or a removable half-wave plate.

The above-mentioned liquid crystal phase modulator is a kind of optical separator, which can control the conversion of light in an electronic control mode.

The above-mentioned half-wave plate (also called λ/2 wave plate, half-wave plate) refers to a birefringent crystal with a certain thickness. When normal incident light passes through the half-wave plate, the phase difference between ordinary light and extraordinary light is equal to π or its odd multiple. The half-wave plate can rotate polarized light. When linearly polarized light enters the half-wave plate perpendicularly, the transmitted light is still the linearly polarized light. The P-type polarized light is converted into the S-type polarized light after passing through the half-wave plate; conversely, the S-type polarized light is converted into the P-type polarized light after passing through the half-wave plate.

The above-mentioned removable half-wave plate means that the half-wave plate can be removed by using manual mode or electric mode when the modulation angle of the phase modulation unit is zero degree. It should be noted that the electric mode may be a mechanical mode. For example, the λ/2 wave plate can be rotated and rolled up by a motor shaft, so that the λ/2 wave plate does not work, which is equivalent to that air or a flat plate does not modulate phase of light.

Figure 4:
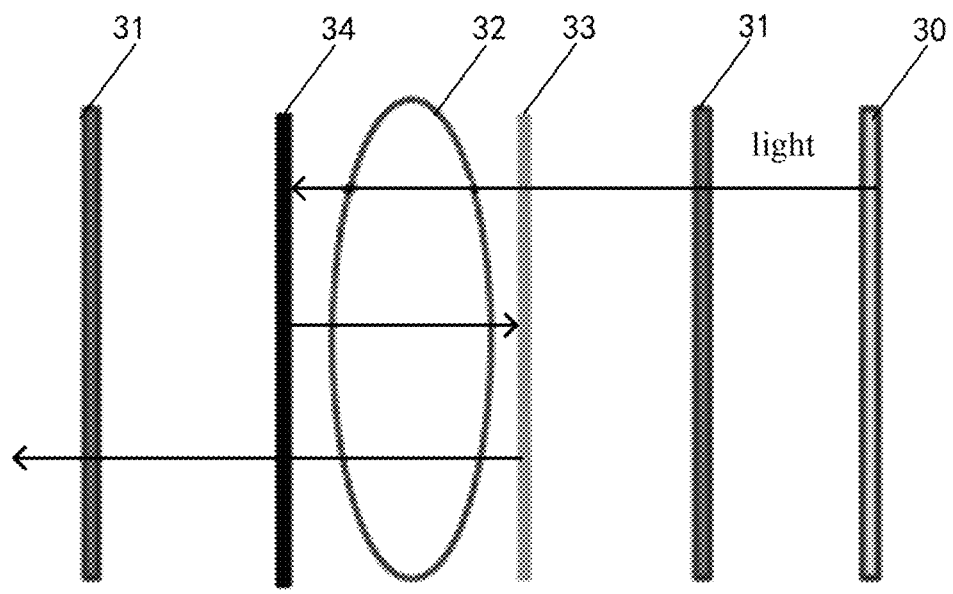
FIG. 4 is a structural schematic diagram of another optical display system according to an embodiment of the present disclosure.

Now take the system for VR optical display shown in FIG. 4 as an example for specific description.

In FIG. 4, both the first light splitting unit and the second light splitting unit are polaroid 31, which can transmit the P light and reflect the S light; the first imaging unit is a single glass lens (lens) 32, and the light-incident surface of the lens 32 is coated with a transflective film 33; the phase modulation unit includes a removable λ/2 wave plate 34, and the λ/2 wave plate 34 is disposed in the light path from the lens 32 to the polaroid 31 (forming the second light splitting unit). In FIG. 4, in order to clearly reflect the function of the transflective film, the transflective film 33 and the lens 32 are placed separately. In practice, the transflective film 33 is disposed on the light-incident surface of the lens 32.

Figure 5:
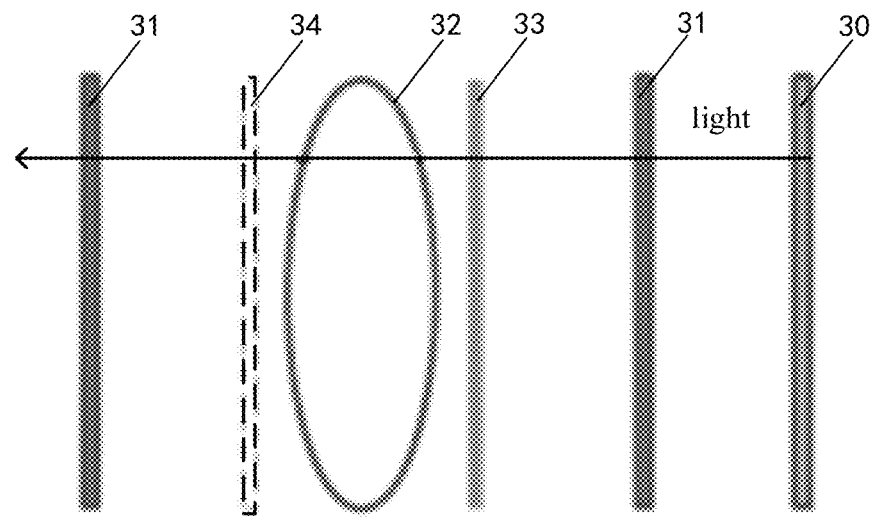
FIG. 5 is a structural schematic diagram of FIG. 4 after removing the half-wave plate.

Referring to FIG. 5, the λ/2 wave plate 34 is removed, FIG. 5 shows the λ/2 wave plate 34 with a dotted line; at this time, a second display screen 30 emits an image M1 representing the scene of the focal plane A1. After the light of the image M1 passes through the polaroid 31 (forming the first light splitting unit), the P light is transmitted to the transflective film 33, the S light is absorbed; then through the transflective film 33, a part of the P light passes through and is magnified by the lens 32, and the other part of the P light is reflected; since the λ/2 wave plate 34 is removed, the P light magnified by the lens 32 directly reaches the polaroid 31 (forming the second light splitting unit), and is emitted from the polaroid 31. In this way, on the light emission side of the second light splitting unit, an image magnified once by the lens 32 can be received, and the image is a virtual image N1 at the focal length B1.

Referring to FIG. 4, the λ/2 wave plate 34 has not been removed and can have an effect of phase modulation; at this time, the second display screen 30 emits an image M2 representing the scene of the focal plane A2, and after the light of the image M2 passes through the polaroid 31 (forming the first light splitting unit), the P light is transmitted to the transflective film 33, and the S light is absorbed; then 50% of the P light passes through the transflective film 33 and is magnified by the lens 32, and the other part of the P light is reflected; the P light magnified by the lens 32 reaches the λ/2 wave plate 34, and becomes the S light due to the phase modulation of the λ/2 wave plate; then, the S light reaches another polaroid 31 (forming the second light splitting unit) and is reflected; it passes through the λ/2 wave plate 34 again and becomes the P light; the light passes through the lens 32 and reaches the transflective film 33, 50% of the light is reflected again, and the phase of the light changes, becoming left-handed circularly polarized light (viewed from the λ/2 wave plate 34 to the lens 32); then passes through the λ/2 wave plate 34 again, the light becomes right-handed circularly polarized light (viewed from the polaroid 31 forming the second light splitting unit to the λ/2 wave plate 34); and then passes through the polaroid forming the second light splitting unit again 31, in which the P component in the circularly polarized light is emitted. In this process, the light path is folded and the light is turned back many times, the lens 32 magnifies the light three times to form a virtual image N2 corresponding to the focal length B2; at the same time, the actual length of the folded light path is short, realizing ultra-thin short focus. In this way, at different time periods, images with different focal lengths can be seen.

Figure 6:
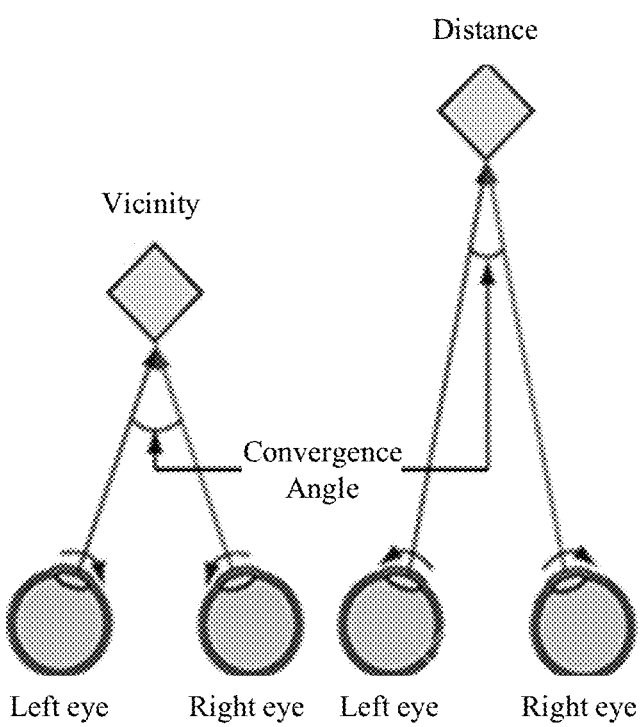
FIG. 6 is a schematic diagram of a convergence angle.

It should be noted that, when the human eye views a 3D object, the principle is that the left and right eyes see different displays of the same image, and parallax appears, and then the images are integrated through the brain to achieve a three-dimensional display. In this process, the two eyes are adjusted to focus on the virtual image plane through the lens, respectively, but after it is integrated by the brain, the eyes need to converge rotation due to the depth difference between the three-dimensional object and the virtual image plane. As a result, eye fatigue will occur when the eyes continue to watch the dynamic 3D image. In eye optics, as shown in FIG. 6, convergence refers to the angle between the two eyes when the two eyes look at the object and the two eyes are fixed on the same object through the rotation of the eyeballs. At present, the VR display device or augmented Reality (AR) display device adopts a single focus and a single image distance, so users will experience eye fatigue and vertigo due to convergence conflicts when using them.

The optical display system has a multi-focal length and can provide a multi-focal surface display, which can reduce the viewer's unfavorable experience such as eye fatigue and vertigo when continuously watching dynamic 3D images, which can greatly reduce convergence conflict and improve user experience. At the same time, VR display with multiple depths of field can be realized, which has the characteristics of high light efficiency, small size, and low cost. In addition, the optical display system adopts a folded light path with a short actual length, which can achieve ultra-thin short focal length to meet the requirements of lightweight.

Optionally, in order to simplify the structures, the first light splitting unit includes a first polaroid or a second polaroid; the first polaroid is configured to transmit the first-type polarized light and reflect the second-type polarized light, which belongs to the reflection-type polaroid; and the second polaroid is configured to be capable to transmit the first-type polarized light and capable to absorb the second-type polarized light, which belongs to the absorption-type polaroid.

If the first-type polarized light is the P-type polarized light, the second-type polarized light is the S-type polarized light, the first polaroid is configured to be capable to transmit the P light and reflect the S light; the second polaroid is configured to be capable to transmit the P light and absorb the S light.

Optionally, the first imaging unit further includes a first lens, and the light splitting film is disposed at a light-incident surface of the first lens.

The first imaging unit may include only a single lens, the single lens may be a convex lens; of course, it may also be a lens group including a plurality of lenses, the lens group may include a combination of a plurality of convex lenses, or a combination of a convex lens and a concave lens, etc. The lens can use double-convex spherical lens or aspherical lens, which is used to produce focal length and magnify the image. In consideration of further reduction in thickness, the imaging unit includes a single lens.

Optionally, in order to simplify the structures, the second light splitting unit comprises a third polaroid, and the third polaroid is configured to be capable to transmit the first-type polarized light and reflect the second-type polarized light, which belongs to the reflection-type polaroid.

If the first-type polarized light is the P-type polarized light, and the second-type polarized light is the S-type polarized light, the third polaroid is configured to be capable to transmit the P-type polarized light and reflect the S-type polarized light.

Optionally, the first-type polarized light is the P-type polarized light, the second-type polarized light is the S-type polarized light; or, the first-type polarized light is the S-type polarized light, the second-type polarized light is the P-type polarized light. It is not limited here, and the embodiments of the present disclosure are described with the former as an example.

An embodiment of the present disclosure provides a display device, including the optical display system provided in the above embodiments.

The display device may be a virtual reality (VR) display device, or other display devices including a folded optical system. The display device has the characteristics of thinness, short focus, and good display effect.

An embodiment of the present disclosure provides a method for controlling the optical display system, the control method may be applied for the optical display system as shown in FIG. 4, and the control method includes:

S01, at a first time period, inputting a first focal plane image signal to the display screen.

S02, controlling the display screen to display a first focal plane image; wherein the light emitted from the display screen forms an enlarged image corresponding to a first focal length, after passing through the first light splitting unit and the first imaging unit in sequence.

The first focal length is a focal length included in the optical display system. Focal distance, also known as focal length, is a measure method of the concentration or divergence of light in an optical system, it refers to the distance from the center of the lens to the focal point of the light.

S03, controlling, at the first time period, the phase modulation unit to have a zero-degree phase modulation value of the light transmitted by the first imaging unit; wherein light modulated by the phase modulation unit is emitted by the second light splitting unit.

S04, at a second time period, inputting a second focal plane image signal to the display screen.

The focal planes of the second focal plane image and the first focal plane image can be the same or different, in order to achieve a better display effect, the latter will be selected.

S05, controlling the display screen to display a second focal plane image; wherein the light emitted from the display screen is converted into the first-type polarized light after passing through the first light splitting unit; the first-type polarized light transmitted from the first light splitting unit is transmitted from the light emission side of the second light splitting unit, after being turned back multiple times among the first imaging unit, the phase modulation unit and the second light splitting unit, and forms an enlarged image corresponding to a second focal length.

The embodiment of the present disclosure provides a method for controlling the optical display system, which can convert the first focal plane image displayed on the display screen into an enlarged image corresponding to the first focal length, and convert the second focal plane image displayed on the display screen into an enlarged image corresponding to the second focal length, so that the human eye can see two enlarged images corresponding to different focal lengths, thereby reducing the convergence conflict problem of the optical display system and improving the user experience.

Optionally, the phase modulation unit includes a removable half-wave plate; and S03, controlling, at the first time period, the phase modulation unit to have a zero-degree phase modulation value of the light transmitted by the first imaging unit includes:

at the first time period, removing the half-wave plate.

Here manual or electric modes can be used to remove the half-wave plate. It should be noted that, the electric mode may be a mechanical mode. For example, the λ/2 wave plate can be rotated and rolled up by the motor shaft, so that the λ/2 wave plate does not work, which is equivalent to that air or a flat plate does not modulate the phase of light.

For the structural content of the optical display system involved in this embodiment, reference may be made to the above embodiment, and details are not described in this embodiment.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 7:
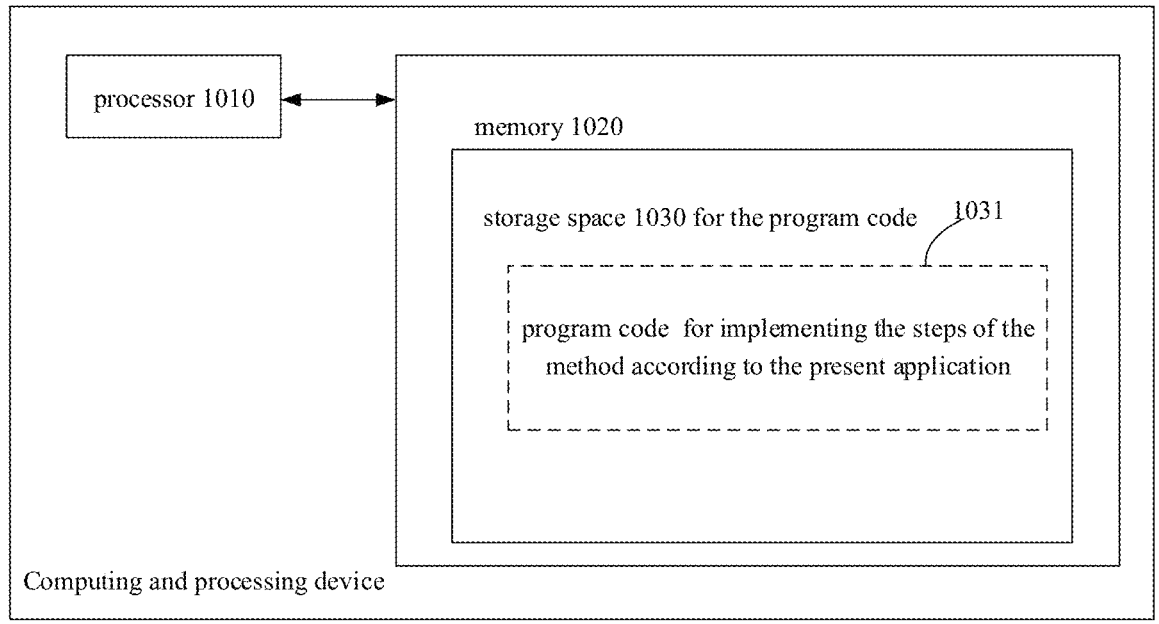
FIG. 7 schematically shows a block diagram of a computing and processing device for implementing the method according to the present disclosure.
Figure 8:
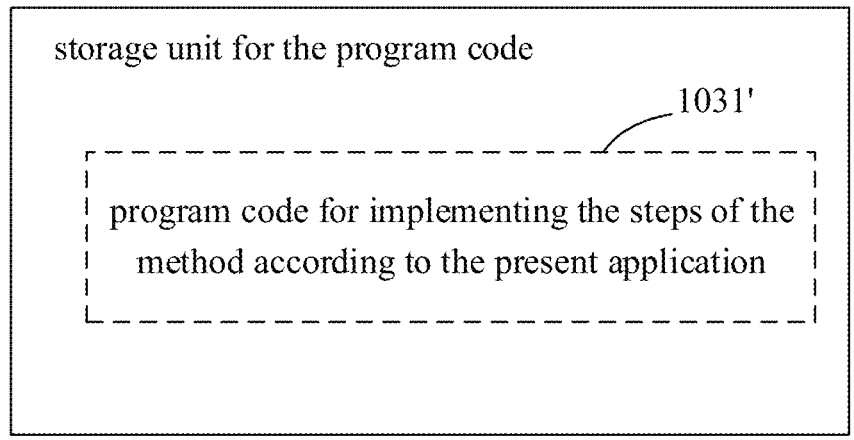
FIG. 8 schematically shows a storage unit for maintaining or carrying a program code for implementing the method according to the present disclosure.

For example, FIG. 7 shows a computing and processing device that can implement the method according to the present disclosure. The computing and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1031 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk as shown in FIG. 8. Such computer program products are usually portable or fixed storage units. The storage unit may have storage segments or storage spaces with similar arrangement to the memory 1020 of the computing and processing device in FIG. 7. The program codes may for example be compressed in a suitable form. Generally, the storage unit contains a computer-readable code 1031', which can be read by a processor like 1010. When those codes are executed by the computing and processing device, the codes cause the computing and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

The above embodiments are only specific implementations of the present disclosure, but the protection scope of the present disclosure is not limited thereto. Any changes or substitutions can be easily thought of by person skilled in the art within the technical scope disclosed in the present disclosure should be covered within the protection scope of the present disclosure. Therefore, the protection scope of the present disclosure should be subject to the protection scope of the claims.

The invention claimed is:

1. An optical display system, wherein the system comprises:
   a display screen;
   a first light splitting unit, disposed at a display side of the display screen, wherein the first light splitting unit is configured to transmit a first-type polarized light and block a second-type polarized light, and light emitted from the display screen is converted into the first-type polarized light after passing through the first light splitting unit;
   a first imaging unit, disposed at a light emission side of the first light splitting unit, wherein the first imaging unit comprises a light splitting film disposed at a light-incident surface of the first imaging unit, and the light splitting film is configured to transmit light and reflect light;
   a second light splitting unit, disposed at a light emission side of the first imaging unit, wherein the second light splitting unit is configured to transmit the first-type polarized light and reflect the second-type polarized light; and
   a phase modulation unit, disposed at least in a light path from the first imaging unit to the second light splitting unit, wherein the phase modulation unit is configured to modulate a phase of light;
   wherein, the first-type polarized light transmitted from the first light splitting unit travels between the first imaging unit and the second light splitting unit as follows: reaching the second light splitting unit after passing through the first imaging unit and the phase modulation unit in sequence; being reflected back to the phase modulation unit by the second light splitting unit, and transmitted, after being modulated by the phase modulation unit, to the light splitting film of the first imaging unit; being reflected to the phase modulation unit by the light splitting film, and transmitting, after being modulated by the phase modulation unit, from the light emission side of the second light splitting unit.

2. The optical display system according to claim 1, wherein the phase modulation unit comprises a first quarter-wave plate and a second quarter-wave plate;
the first quarter-wave plate is disposed in a light path from the first light splitting unit to the first imaging unit; the second quarter-wave plate is disposed in the light path from the first imaging unit to the second light splitting unit.

3. The optical display system according to claim 2, wherein the optical display system further comprises a second imaging unit disposed at the light emission side of the second light splitting unit.

4. The optical display system according to claim 3, wherein the first imaging unit further comprises a first lens, the light splitting film is disposed at a light-incident surface of the first lens; and
the second imaging unit comprises a second lens.

5. The optical display system according to claim 4, wherein the first lens is a glass lens, and the second lens is a plastic lens.

6. The optical display system according to claim 4, wherein the second imaging unit further comprises a metal wire-grid film disposed at a light-incident surface of the second lens; and
the metal wire-grid film is configured to be capable to transmit the first-type polarized light and capable to absorb the second-type polarized light.

7. The optical display system according to claim 1, wherein the phase modulation unit is disposed in the light path from the first imaging unit to the second light splitting unit; and
the phase modulation unit is further configured to modulate the phase of light at different angles in different display periods.

8. The optical display system according to claim 7, wherein the phase modulation unit comprises a liquid crystal phase modulator or a removable half-wave plate.

9. The optical display system according to claim 1, wherein the first light splitting unit comprises a first polaroid or a second polaroid;
the first polaroid is configured to transmit the first-type polarized light and reflect the second-type polarized light; and
the second polaroid is configured to be capable to transmit the first-type polarized light and capable to absorb the second-type polarized light.

10. The optical display system according to claim 1, wherein the first imaging unit further comprises a first lens, and the light splitting film is disposed at a light-incident surface of the first lens.

11. The optical display system according to claim 1, wherein the second light splitting unit comprises a third polaroid, and the third polaroid is configured to transmit the first-type polarized light and reflect the second-type polarized light.

12. The optical display system according to claim 1, wherein the first-type polarized light is P-type polarized light, the second-type polarized light is S-type polarized light;
or,
the first-type polarized light is the S-type polarized light, the second-type polarized light is the P-type polarized light.

13. A display device, wherein, the display device comprises the optical display system according to claim 1.

14. The display device according to claim 13, wherein the display device is a virtual reality display device or an augmented reality display device.

15. The display device according to claim 13, wherein the display device comprises a folded optical system.

16. A method for controlling the optical display system according to claim 7, wherein the method comprises:
at a first time period, inputting a first focal plane image signal to the display screen;
controlling the display screen to display a first focal plane image; wherein the light emitted from the display screen forms an enlarged image corresponding to a first focal length after passing through the first light splitting unit and the first imaging unit in sequence;
controlling, at the first time period, the phase modulation unit to have a zero-degree phase modulation value of the light transmitted by the first imaging unit; wherein light modulated by the phase modulation unit is emitted by the second light splitting unit;
at a second time period, inputting a second focal plane image signal to the display screen; and
controlling the display screen to display a second focal plane image; wherein the light emitted from the display screen is converted into the first-type polarized light after passing through the first light splitting unit; the first-type polarized light transmitted from the first light splitting unit travels between the first imaging unit and the second light splitting unit as follows: reaching the second light splitting unit after passing through the first imaging unit and the phase modulation unit in sequence; being reflected back to the phase modulation unit by the second light splitting unit, and transmitted, after being modulated by the phase modulation unit, to the light splitting film of the first imaging unit; being reflected to the phase modulation unit by the light splitting film, and transmitting, after being modulated by the phase modulation unit, from the light emission side of the second light splitting unit, and forms an enlarged image corresponding to a second focal length.

17. The method for controlling the optical display system according to claim 16, wherein the phase modulation unit comprises a removable half-wave plate that does not modulate phase of light in the first time period;
the step of controlling, at the first time period, the phase modulation unit to have a zero-degree phase modulation value of the light transmitted by the first imaging unit comprises:
at the first time period, removing the half-wave plate from the light path from the first imaging unit to the second light splitting unit.

18. A computing and processing device, comprising:
a memory, wherein the memory stores a computer-readable code; and
one or more processors, and when the computer-readable code is executed by the one or more processors, the computing and processing device executes the method for controlling the optical display system according to claim 16.

19. A computer program, wherein the computer program comprises a computer-readable code, and when the computer-readable code is executed on a computing and processing device, the computer-readable code causes the computing and processing device to implement the method for controlling the optical display system according to claim 16.

20. A non-transitory computer-readable medium, wherein the computer-readable medium stores the computer program according to claim 19.

* * * * *